(12) United States Patent
Lewis et al.

(10) Patent No.: US 7,798,578 B2
(45) Date of Patent: Sep. 21, 2010

(54) DRIVER FEEDBACK TO IMPROVE VEHICLE PERFORMANCE

(75) Inventors: Donald J. Lewis, Howell, MI (US); John D. Russell, Portland, OR (US); Christopher S. Tuttle, Portland, OR (US)

(73) Assignee: Ford Global Technologies, LLC, Dearborn, MI (US)

( * ) Notice: Subject to any disclaimer, the term of this patent is extended or adjusted under 35 U.S.C. 154(b) by 418 days.

(21) Appl. No.: 11/465,422

(22) Filed: Aug. 17, 2006

(65) Prior Publication Data

US 2008/0042489 A1 Feb. 21, 2008

(51) Int. Cl.
*B60T 8/64* (2006.01)

(52) U.S. Cl. ............... 303/151; 303/152; 180/65.21; 180/65.31; 340/439

(58) Field of Classification Search .......... 303/151, 303/152; 180/65.1, 65.2, 65.3, 65.4; 434/64, 434/65; 340/438, 439, 451, 452, 455, 459, 340/461, 467

See application file for complete search history.

(56) References Cited

U.S. PATENT DOCUMENTS

| | | | | |
|---|---|---|---|---|
| 4,351,405 A | * | 9/1982 | Fields et al. | 180/65.225 |
| 4,542,460 A | * | 9/1985 | Weber | 701/1 |
| 5,693,876 A | * | 12/1997 | Ghitea et al. | 73/114.53 |
| 6,309,031 B1 | * | 10/2001 | Crombez et al. | 303/113.4 |
| 6,751,534 B2 | * | 6/2004 | Robichaux et al. | 340/439 |
| 7,603,228 B2 | * | 10/2009 | Coughlin | 701/70 |
| 7,646,289 B2 | * | 1/2010 | Tamai et al. | 340/439 |
| 2001/0039230 A1 | * | 11/2001 | Severinsky et al. | 477/3 |
| 2008/0100129 A1 | * | 5/2008 | Lubbers | 303/113.1 |

FOREIGN PATENT DOCUMENTS

| | | |
|---|---|---|
| DE | 10218012 | 11/2003 |
| FR | 2828155 | 2/2003 |
| JP | 2002370560 | 12/2002 |
| JP | 2003343305 | 12/2003 |

OTHER PUBLICATIONS

Frank et al., Electric Vehicles Only, 1991, Popular Science, May issue, pp. 76, 78-81 and 110.*

Chan et al., Symbiotic Car: Haptic Feedback Accelerator Pedal, published 2003-2004, Volkswagen of America Electronics Research Lab in conjuction with Stanford University.*

Chan, Kevin, et al., "Symbiotic Car: Haptic Feedback Accelerator Pedal." Volkswagen of America Electronics Research, <http://wikibox.stanford.edu/docushare2003/dsweb/Get/Document-7280/VW03-04.pdf>, Nov. 27, 2006.

(Continued)

*Primary Examiner*—Thomas J Williams
(74) *Attorney, Agent, or Firm*—Allan J. Lippa; Alleman Hall McCoy Russell & Tuttle LLP (57) ABSTRACT

A system for providing driver feedback is disclosed. In one embodiment, the system provides a driver with feedback in response to a brake pedal and an accelerator pedal. The system may help to increase vehicle fuel economy.

8 Claims, 6 Drawing Sheets

OTHER PUBLICATIONS

Glaskin, Max, "Vibrating pedal says 'ease off gas,'" New Scientist, Mar. 22, 2004, New Scientist Print Edition, <http://www.newscientist.com/article/dn4787-vibrating-pedal-says-ease-off-gas.html>, Nov. 27, 2006.

Hudson, Mike and Reed, Philip, "We Test the Tips: What Really Saves Gas? And How Much?" edmunds.com, Nov. 22, 2005, <http://www.edmunds.com/ownership/driving/articles/106842/article.html>, Nov. 27, 2006.

Zienhowicz, Chris, "1975 AMC Pacer Home Page," <http://faculty.concord.edu/chrisz/hobby/75-Pacer-1.html>, Nov. 27, 2006.

"A Low Cost OBD2 All-In-One Scan Tool," OBD Diagnostics, Inc., <http://www.obd2allinone.com>, Nov. 27, 2006.

"Driving Skills for Life: Eco-Driving," Ford Motor Company and the Governors Highway Safety Association, <http://www.drivingskillsforlife.com/content/view/3/14/lang,en/>, Nov. 27, 2006.

"Top Tips for Fuel Efficient Driving," Shell Media Centre, <http://www.shell.com/home/Framework?siteId=media-en&FC2=&FC3=/media-en/html/iwgen/feature_stories/2006/fuel_efficiency_tips_17012006.html>, Nov. 27, 2006.

* cited by examiner

DRIVER FEEDBACK TO IMPROVE VEHICLE PERFORMANCE

BACKGROUND AND SUMMARY

Various operations and strategies may be used in hybrid vehicles to improve overall fuel economy. One approach utilizes regenerative braking where vehicle braking energy is stored for later use in propelling the vehicle. For example, in hybrid-electric vehicles, an electric machine may be at least partially coupled to the wheels/powertrain to provide braking torque by generating electrical energy that may be stored in a battery or other electric storage device. Thus, during later propulsion, the stored electrical energy may be converted to propel the vehicle, thereby saving fuel that would otherwise be spent in the engine, for example.

Because such regenerative braking systems may not generally provide sufficient braking performance for all vehicle operating conditions, hybrid vehicles may additionally utilize dissipative brake systems to brake the vehicle. For example, if a driver requests more braking than can be provided by the regenerative brake system, mechanical-friction wheel brakes may be applied on one or more wheels. In this way, sufficient vehicle braking performance can be provided.

However, the inventor herein has recognized a problem with such systems in practice especially when a particular class of drivers operate the vehicle. Specifically, some vehicle operators aggressively actuate the drive controls, such as the gas pedal and/or brake pedal, even when aggressive pedal or brake actuation may not be required. As a result, these operators typically achieve less fuel economy performance from hybrid vehicles because the aggressive brake actuation, for example, results in more dissipative braking than necessary, thus reducing the potential fuel economy gains achievable through regenerative braking.

The above issues may be addressed, in one example, by a system for a hybrid vehicle driver by an operator, comprising: an energy storage device; a regenerative braking system coupled to the energy storage device; a dissipative braking system coupled to the vehicle; a brake lever; a haptic operator interface; a control system for operating one or both of the regenerative and dissipative braking system in response to actuation of the brake lever, and providing feedback to the operator through the haptic interface differentiating a type of braking operation.

In this way, it may be possible to give feedback to the operator that indicates when driver braking actuation surpasses that which can be provided by the regenerative braking system, thus causing activation of dissipative braking. As such, the operator can learn by experience and real-time feedback how to apply less brake actuation for various conditions when possible to improve use of regenerative braking and thus improve vehicle fuel economy. In other words, the operator can learn at what point of brake actuation dissipative braking is applied for a given set of conditions, and can then adjust brake actuation, when possible to reduce use of the dissipative braking.

Note that various other alternatives approaches may also be used. For example, while a haptic interface may be advantageously used in some examples, on other examples visual and/or audio displays may also be used, and may be more advantageous in some cases. Also, the haptic or other feedback may be provided to the driver in various ways, such as when dissipative braking begins, or before dissipative braking is about to begin to provide the driver an opportunity to reduce braking, if possible, and avoid or reduce the dissipative braking. Further, various other alternative approaches may be used as described herein.

DETAILED DESCRIPTION

Figure 1:
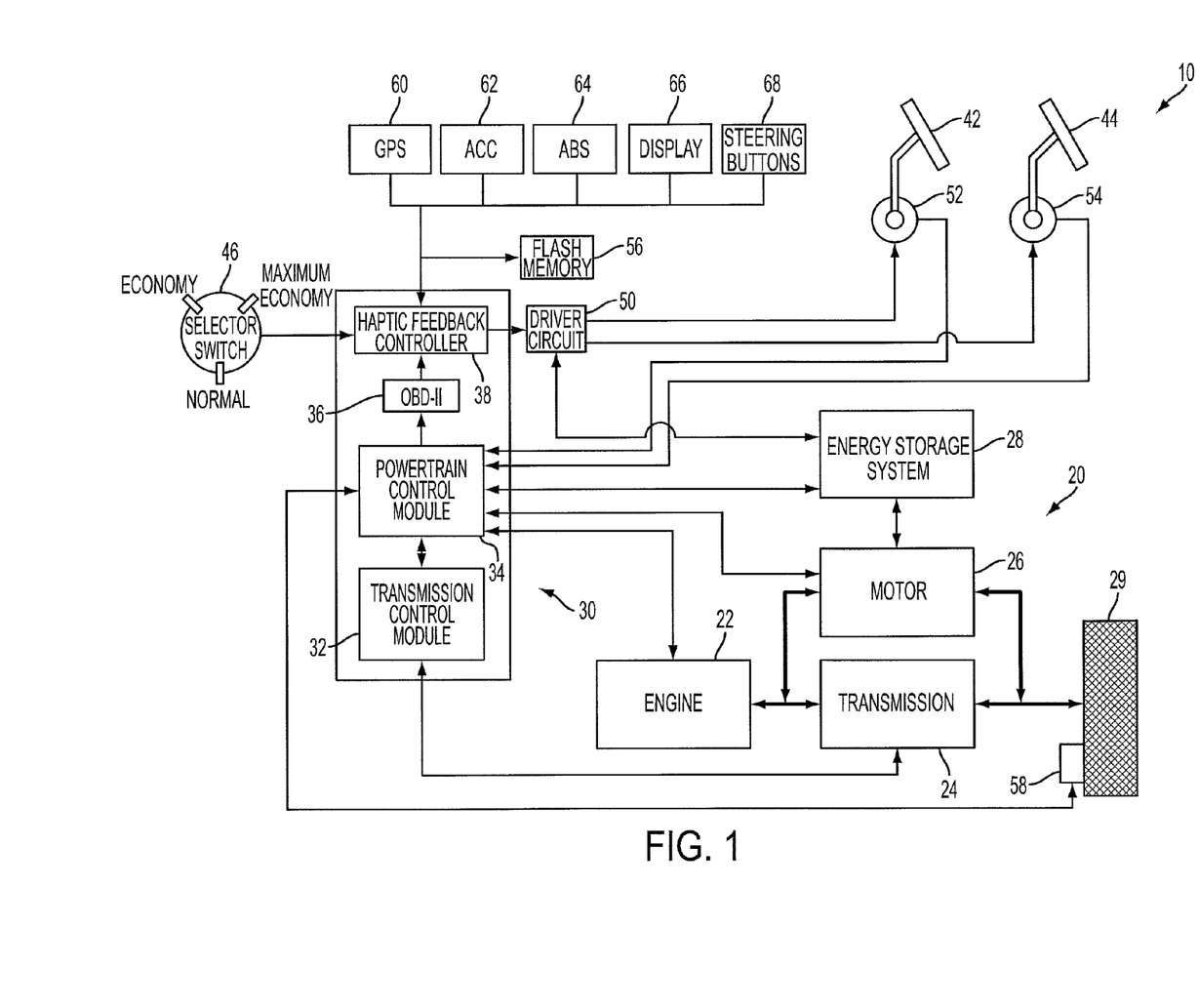
FIGS. 1-2 show an example vehicle having at least some dissipative and regenerative braking.

Referring to FIG. 1, a block diagram of a vehicle system 10 is shown. Vehicle system 10 may include a propulsion system 20 including an internal combustion engine 22 that may be used to supply torque to at least one drive wheel 29 via a transmission 24. Vehicle system 10 may also include a motor 26 that may be used to supply torque to the engine and/or drive wheels of the vehicles during some operations in what may be referred to as a hybrid vehicle. Motor 26 may also be operated to selectively absorb torque from the engine and/or drive wheels by performing a generator function. Torque absorbed by motor 26 may be converted to an energy form suitable for storage in an energy storage system 28. As one example, motor 26 may include an electric motor and energy storage system 28 may include one or more batteries for storing electrical energy. As another example, motor 26 may include a hydraulic motor and energy storage system 28 may include one or more vessels suitable for storing pressurized hydraulic fluid. In some embodiments, motor 26 may include at least one of an integrated starter/generator (ISG), a crank ISG, belt driven ISG, a smart alternator, etc.

Further, motor 26 may include two or more separate motors. As one example, a first motor may be configured to provide torque to the vehicle drive wheels while a second motor may be configured as a dedicated generator for absorbing torque independent of the first motor. Further, a first motor may be configured to supply and/or absorb torque to the engine side of the transmission while a second motor may be configured to supply and/or absorb torque to the drive wheel side of the transmission. For example, the first motor may be used to facilitate engine starting (e.g. via an ISG, crank ISG, belt driven ISG, etc.) while the second motor may be used to assist in vehicle braking in what may be referred to as regenerative braking.

The vehicle system may further include a dissipative braking system 58 for slowing drive wheel 29. Dissipative braking system 58 may include a friction brake such as a drum brake, disc brake, or other suitable brake for dissipating kinetic energy of the vehicle. During operation, the vehicle may be slowed using only the dissipative braking system. Alternatively, the vehicle may be slowed using only the regenerative braking performed by one or more motors operating as a generator to recapture the kinetic energy of the vehicle. In yet other conditions, both dissipative and regenerative braking may be used to slow the vehicle.

It should be appreciated that propulsion system of vehicle system 10 may be configured as what may be referred to as a parallel hybrid, series hybrid, or combination thereof depending on the arrangement of the drivetrain. For example, a parallel hybrid enables the engine to propel the vehicle without the motor, enables the motor to propel the vehicle without the engine (e.g. engine is shut-off or idled), and enables the engine and the motor to simultaneously contribute to propelling the vehicle. On the other hand, a series hybrid includes the operation of the motor to propel the vehicle and the engine is used only for providing electrical energy to the motor and/or energy storage system. It should be appreciated that the various hybrid configurations described herein are non-limiting examples of possible hybrid propulsion systems and that other suitable hybrid vehicle propulsion systems may be used.

The vehicle system 10 may further include a control system 30 including one or more of a transmission control system 32, an engine control module 34, OBD-II data port interface 36, and a haptic feedback controller 38. While the controller 38 could be a separate module, this functionality could instead be incorporated into the powertrain or engine control module 34 instead. A transmission control module 32 is shown to illustrate that separate engine and transmission control modules may be provided in some embodiments. One example of a suitable embodiment for controller 38 is the Texas Instruments TMS470R1B1M 16/32-Bit RISC microcontroller chip. This microcontroller chip features one megabyte of flash memory and two Controller Area Network (CAN) controllers. The CAN bus protocol is used in many vehicle systems today. However, the principles of the present invention are not limited to any particular bus structure or protocol.

FIG. 1 also shows a flash memory circuit 56 connected to the controller 38, as other suitable controllers may not necessarily be equipped with non-volatile memory that can be used for recording events and other data. Whether or not the functionality of the controller 38 is integrated into the engine control module 34 or some other controller onboard the vehicle, the microcontroller may include readable code stored in memory corresponding to a driver coaching method. In a dealer service context, it may be appropriate to upload the software instructions containing this method into an existing onboard controller equipped with flash or EEPROM-based memory. In an aftermarket embodiment shown primarily in FIG. 2, the haptic feedback controller 38 may be coupled to the engine control module 34 through the OBD-II data port interface 36. OBD-II refers to an automotive standard in the U.S. for onboard diagnostics that requires the provision of a standard 16-pin connector accessible in the vehicle's cabin generally below the steering wheel. DC power is even made available through this onboard connector. While a connection directly to the CAN bus onboard the vehicle is an alternative in an aftermarket embodiment, it should be appreciated that the standard OBD-II connector provides a simple and low-cost point of connection specifically designed to provide an appropriately isolated data port. It should also be noted that a similar data port exists in Europe under the European Onboard Diagnostic (EOBD) standard.

The vehicle may include driver input devices such as accelerator pedal 42 and brake pedal 44. One or more of these driver input devices may communicate with the engine control module 34 for controlling the acceleration and braking of the vehicle. While the driver input devices may include foot pedals, other types of input devices may be used such as hand or foot levers, finger buttons, or other suitable user input device for controlling operation of the vehicle. Further, haptic feedback controller 12 can provide feedback to the driver via one or more haptic interfaces via actuators such as electromechanical devices 52 and 54 coupled to respective pedals 42 and 44. A driver circuit 50 may be used to facilitate transmission driver feedback signals from the haptic feedback controller to one or more of the electromechanical devices 52 and 54. As will be described in detail with reference to FIG. 2, each electromechanical device may include a motor that can cause movement of the respective pedal to alert the driver under select conditions. Driver circuit 50 may be any suitable circuit capable of selectively applying electrical power to the electromechanical devices. An exemplary motor driver circuit is illustrated in FIG. 15 of U.S. Pat. No. 5,897,437 issued on Apr. 27, 1999 to Nishiumi et al., entitled "Controller Pack." This patent is hereby incorporated by reference.

In one approach, one or more motors may be used to provide a sufficient magnitude of haptic feedback to be perceptible, but not distractive to the driver. As demonstrated by the vibration motor in a typical cellular phone, the motor can be quite small. Additionally, as exemplified by U.S. Pat. No. 6,693,922, issued on Feb. 17, 2004 and assigned to Immersion Corp., entitled "Vibrotactile Haptic Feedback Devices," consumers are becoming used to vibrotactile devices, such as in a force feedback game pad controller. A wide variety of vibration motors may be used for the electromechanical devices, such as vibrator motor 4SH3-0212B from China Jinlong Holdings Group or even a 1.5 to 3VDC motor (model 273-223) from Radio Shack with an eccentric mass attached to its rotor as shown in greater detail in FIG. 2. Other types of vibration motors are based upon piezoelectric, solenoid or electromagnetic operation, such as the Alps Electric ForceReactor™ AF series short-vibration feedback device. However, it should be appreciated that the principles of the present invention are not limited to vibration motors per se. Other tactile feedback or other sense-of-touch feedback actuators may be suitable for this application, providing that they do not adversely interfere with the operation of the accelerator pedal or cause the driver to overreact. For example, in a vehicle equipped with adjustable pedals, a rapid toggling back and forth of the motor that adjusts the movement of the accelerator and brake pedal assembly can be perceived as a haptic signal to the driver without changing vehicle operation. In other words, in some applications, a single motor may be used to provide haptic feedback through both the accelerator and brake pedals.

Haptic feedback controller 12 can also send and/or receive information with one or more of a global positioning system (GPS) 60, an adaptive cruise control system (ACC) 62, an anti-lock braking system (ABS) 64, a display 66, one or more user input devices such as steering buttons 68, and a selector switch 46. Selector switch 46 can allow a user to select between two or more driving modes such as an "economy" mode, a "normal" mode, and a "maximum economy" mode. Display 66 may include a touch-screen display in the vehicle, such as may be employed in connection with GPS system 62, and could alternatively be employed to incorporate the functionality of the switch 46. The functionality of the switch 46 could also be incorporated into a voice command system for the vehicle or the steering wheel buttons 68 as well. While the touch-screen display 66 could be used to provide visual feedback to the driver in addition to the haptic feedback, it should be appreciated that such visual feedback is not essential in every application.

Thus, for example, if the vehicle is equipped with an adaptive cruise control system (ACC) 62, then this information could be used to enable the haptic feedback controller 38 to provide feedback to the driver when a greater separation between vehicles would be beneficial. An exemplary ACC system is disclosed in U.S. Pat. No. 6,708,099 issued on Mar. 16, 2004 an assigned to the assignee of the present invention, entitled "Stop And Go Adaptive Cruise Control System." This patent is hereby incorporated by reference. Similarly, the antilock braking system (ABS) 64 could be used to provide braking intensity information to the haptic feedback controller 38. Alternatively, braking force could be interpolated by monitoring the rate at which the vehicle is decelerating.

In accordance with the present invention, the vehicle driver may determine how much driving style guidance or coaching is provided by the haptic feedback controller via one or more electromechanical devices. For example, the driver may want or need to achieve the highest fuel economy possible during one particular trip or time interval, but the same driver may be willing to accept a lesser degree of fuel economy during another trip or time interval. Thus, in one embodiment of the present invention, a human-machine interface (HMI) is coupled to controller 38 in the form of a three-position selector switch 46. The switch 46 enables the driver to select between a normal mode of operation, an economy mode of operation and a maximum economy mode of operation. In the normal mode of operation, no haptic feedback need be provided by apparatus 12. In the maximum economy mode of operation, haptic feedback may be provided to the driver that is suited to achieving the highest fuel economy that can be practically achieved for the vehicle. However, not all drivers may want this level of feedback, as some drivers may want to accelerate more rapidly or drive at a higher highway speed, and so forth. Accordingly, at least one additional setting may be provided by switch 46, labeled as the economy mode of operation. This intermediate setting may still encourage high fuel economy, but not discourage use of the haptic feedback system.

Figure 2:
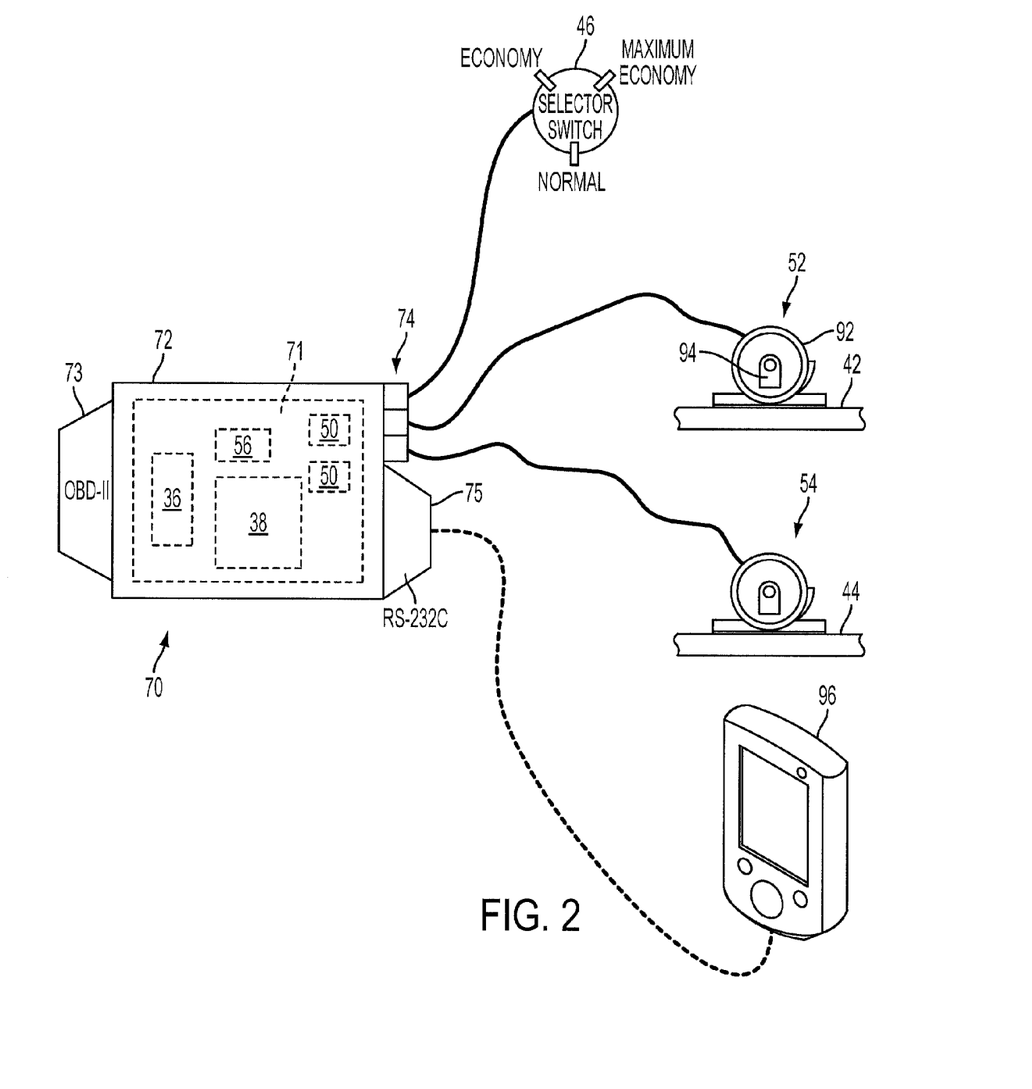

As illustrated in FIG. 2, the haptic feedback system 70 may be configured as a separate unit from the vehicle that may be installed as an after market device. For example, the OBD-II data interface 36, the microcontroller 38 and a motor driver circuit 50 may be mounted on a circuit board 71 that is housed in a module enclosure 72 with a mating OBD-II connector 73 at one end an output interface 74 at the other end. While the connector 73 is shown attached to the enclosure 72, it should be appreciated that the connector 73 could alternatively be coupled to the enclosure via a ribbon cable or the like. An example of a commercially available OBD-II interface product having a circuit board therein is the T16-002 interface from Multiplex Engineering, Inc. of Goleta, Calif. Elm Electronics of Toronto Canada also provides a ELM320-OBD (PWM) to RS232 Interpreter circuit that forms the basis of several OBD-II data interfaces, such as the All-In-One scan tool from OBD Diagnostics, Inc. of Redondo Beach, Calif. The output interface 74 preferably includes a connector to provide a communication output, such as RS-232C connector 75. An RS-232C connection is typically used with OBD-II scan tools for connecting to computer or a personal data assistant device like PDA 96. While a removable wired connection to PDA 96 is shown in FIG. 2, it should be appreciated that wireless communication may also be employed, such as through a Bluetooth transceiver available from AutoEnginuity, L.L.C. of Mesa, Ariz. Additionally, the functionality of switch 46 could be incorporated into a software program for PDA 96 as an alternative aftermarket package.

FIG. 2 further shows electromechanical devices 52 including motor 92 having an eccentric mass 94 attached to the motor. Motor 92 is shown mounted to accelerator pedal 42. During conditions where haptic feedback is to be provided to the driver, the motor may be operated to provide vibration or movement to the accelerator pedal. Similarly, electromechanical device 54 is shown coupled to brake pedal 44 and communicating with the haptic feedback system 70.

It should be appreciated that the embodiment of haptic apparatus 70 in FIG. 2 may be packaged and sold as an aftermarket unit for quick and proper installation (with or without PDA 96), preferably at an authorized dealer. An electromechanical device such as motor 92 may be mounted at an appropriate location on the accelerator pedal itself, such as the back side thereof, or at any other location operatively associated with the accelerator pedal, so that the driver can receive haptic feedback through the accelerator pedal. For example, the motor 92 may be secured to a stationary bracket that forms part of the accelerator pedal assembly via an adhesive-backed plastic mounting clip. Of course, other suitable mounting techniques may be used in the appropriate application, but quick connectors are generally preferred to keep installation costs low, such as with snap-in locking tangs. For example, in the appropriate application, a Velcro® hook and loop fastener could be used, which would enable an aftermarket apparatus 12 to easily be transferable to another vehicle.

In one form of the present invention, the selector switch 46 includes an ITT Industries, Cannon C&K Rafix22QR illuminated rotary selector switch model number 1.30 242.136. This switch may be mounted to the instrument panel or any other suitable location that can be easily reached by the driver. It should also be appreciated that many other types of switches may be employed. For example, additional switch pole positions could be provided to provide more fine-tuning control for the driver, even to the extent of providing a continuously variable switch like that of the volume control on a radio. Alternatively, the operation of existing switches in the vehicle may be reprogrammed to provide the functionality of switch 46, such as an informational cluster.

Figure 3:
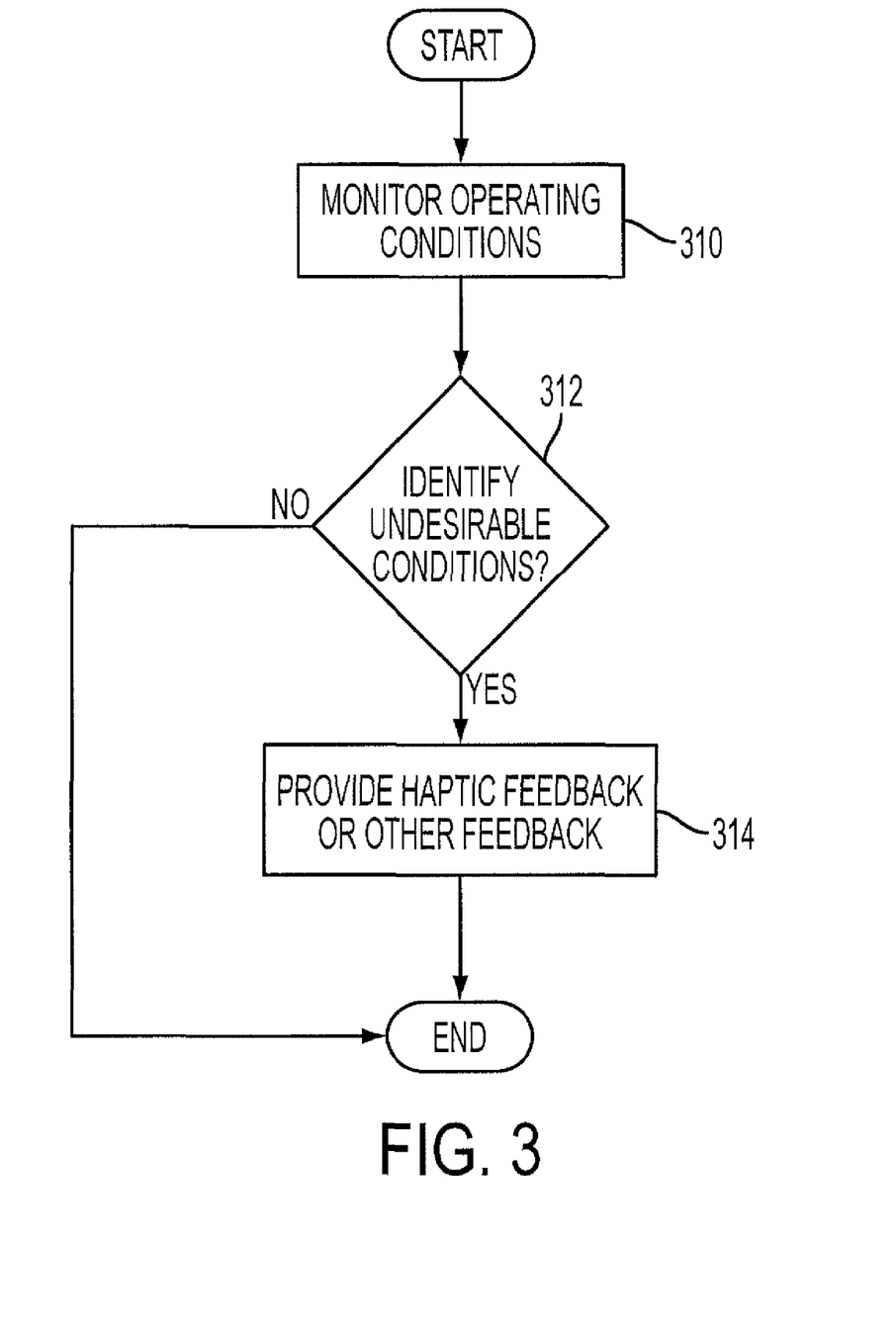
FIGS. 3-6 show high level routines of example vehicle operation.

Referring now to FIG. 3, a high level flow chart of system control and operation in an example configuration is illustrated. First, in 310 the routine monitors one or more operating conditions, such as a vehicle operating condition, an engine operating condition, a driver operating condition, etc. Then, in 312, the routine identifies whether an undesirable condition is present that may warrant feedback to the vehicle operator. For example, the routine may identify undesirable driver behavior or driver inputs that may degrade vehicle performance, such as fuel economy. The routine may also identify undesirable driver behavior for the particular vehicle and/or ambient conditions present. Further still, the routine may identify a lack of an appropriate driver input at the current vehicle conditions.

If the answer to 312 is yes, the routine continues to 314 to provide feedback to the vehicle operator in response to the identification. In one example, the feedback may be through a haptic interface, such as electromechanical devices 52 and 54 of FIGS. 1 and 2. Alternatively, the feedback may be a visual, audio, or other sensory feedback, such as a message on a message center, an illuminated display, or other such signal. Further, the feedback may be the absence of a signal or other display to the operator. Further still, the feedback may be vibration of relevant driver interface, such as a brake pedal and/or gas pedal.

Figure 4:
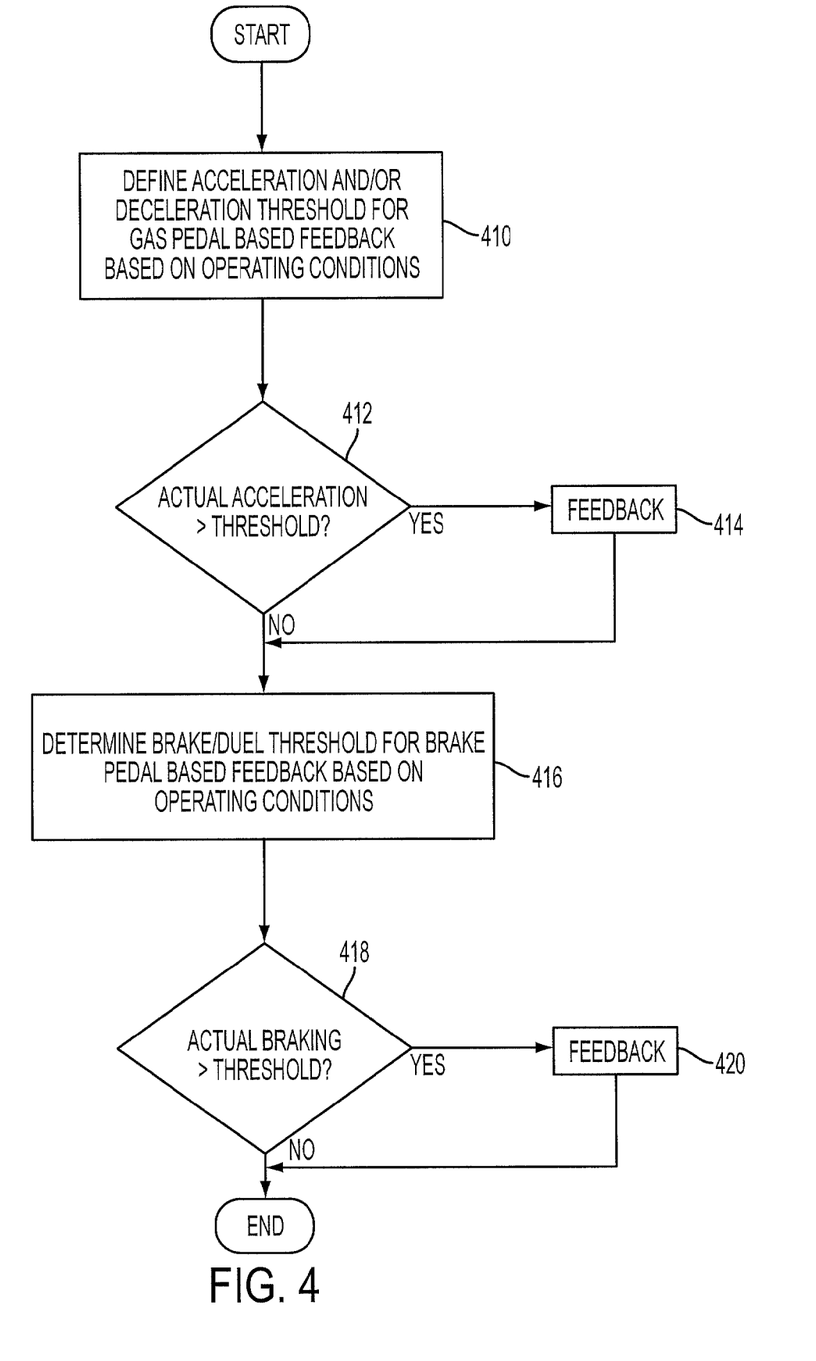

Referring now to FIG. 4, a more specific example of a driver feedback system is described in which vehicle acceleration/deceleration based fuel economy improvements may be achieved through a haptic interface. First, in 410, the routine determines a driver-gas-pedal-related input threshold based on operating conditions, such as current vehicle, engine, transmission, and/or ambient conditions. For example, in the example where vehicle acceleration thresholds are used beyond which driver feedback is provided, the input threshold of 410 may also take into account conditions such as road grade so that aggressive driver pedal inputs during conditions where the vehicle is traversing steep grades, feedback to the driver may be reduced, suppressed, or provided with different threshold values. Likewise, in this example, the routine may also take into account ambient and/or engine temperature in determining the thresholds, so as to reduce or suppress feedback during cold conditions in which aggressive driving may act to increase engine temperature and thereby reduce friction. In yet another example, the routine may set a pedal tip-out threshold for detecting when a driver too aggressively removes actuation of the gas pedal, possibly indicating close following or other operation which can lead to decreased fuel economy or other performance. In still another example, the routine may adjust the thresholds in response to a driver selected level, such as low fuel economy, medium fuel economy, and high fuel economy, or no feedback. However, other levels or more or less levels may also be used.

Next, in 412, the routine determines whether a driver pedal input has exceeded the threshold. For example, if an acceleration (or deceleration) threshold is determined in 410, the routine determines whether driver operation has generated an actual acceleration (or deceleration) beyond the threshold value. If so, the routine continues to 414 to provide feedback to the operator, such as through a haptic interface coupled to the gas pedal. Note that various forms of feedback may be used, such as visual, audio, haptic, or others.

In this way, the vehicle operator may learn to identify how to operate the gas pedal in a manner to increase vehicle fuel economy by reducing unnecessary acceleration/deceleration operation.

Continuing with FIG. 4, in 416, the routine determines a driver-brake-pedal-related input threshold based on operating conditions, such as current vehicle, engine, transmission, battery storage, and/or ambient conditions. For example, in the example where vehicle brake torque demand thresholds are used beyond which driver feedback is provided, the input threshold of 416 may also take into account conditions such as road grade so that aggressive driver brake inputs during conditions where the vehicle is traversing steep grades, feedback to the driver may be reduced, suppressed, or provided with different threshold values. In another example, the routine may set a brake pedal torque demand threshold for detecting when a driver requests braking beyond that which can be provided by a regenerative brake system, possibly indicating excessive braking operation. In this example, the routine may also take into account battery state of charge conditions in a hybrid vehicle, so as to reduce or suppress feedback during high state of charge conditions where additional regenerative braking may not be converted to stored energy.

Next, in 418, the routine determines whether a driver brake pedal input has exceeded the threshold. The routine may determine whether a degree of brake actuation has exceeded a threshold amount, and/or a frequency of brake actuation has exceeded a threshold. For example, if a brake torque demand threshold is determined in 416, the routine determines whether driver operation has generated an actual brake torque demand beyond the threshold value. If so, the routine continues to 420 to provide feedback to the operator, such as through a haptic interface coupled to the brake pedal. Note that various forms of feedback may be used, such as visual, audio, haptic, or others.

In this way, the operator may learn to identify how to operate the brakes in a manner to increase use of regenerative braking and reduce use of dissipative braking, thereby improve vehicle performance and reducing brake wear.

Figure 5:
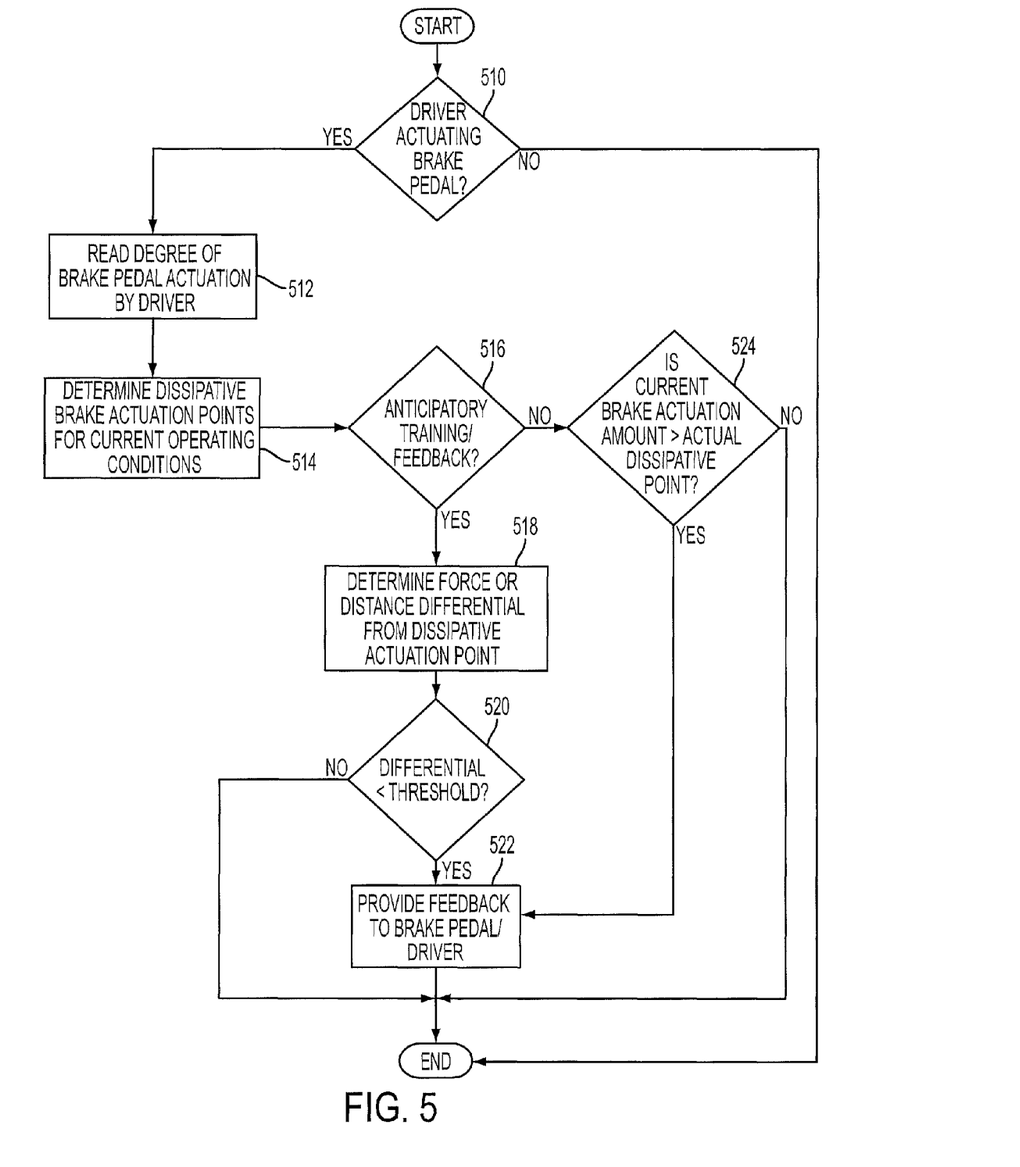

Referring now to FIG. 5, a routine is provided to illustrate an example approach to determining appropriate braking thresholds in the example of a hybrid vehicle. Note that while this example is described with regard to a hybrid electric vehicle, other hybrid vehicle types may be used.

First, in 510, the routine determines whether the driver is actuating the brake pedal. Such a determination may be made by monitoring driver depression or applied foot force to the brake pedal, or by estimating driving braking actuation via other sensors, for example. If so, the routine continues to 512 to read the degree of diver brake actuation, such as an amount of depression of the brake pedal and/or a driver foot application or interaction force with the brake pedal.

Next, the routine continues to 514 to determine the dissipative brake actuation point for the current operating conditions. For example, the routine may determine the amount of depression or amount of brake pedal force beyond which the system will apply the friction wheel brakes, taking into account the current vehicle speed, vehicle deceleration, engine torque, battery state of charge, motor/generator torque, grade, and/or others.

In 516, the routine then determines whether anticipatory training and/or feedback are to be provided. For example, in some examples, the routine may provide anticipatory feedback to notify the driver that dissipative braking is imminent before dissipative braking is actually performed. Alternatively, the routine may provide feedback substantially at or after dissipative braking is performed. If the answer to 516 is yes, the routine continues to 518 to determine a differential between the actual conditions and the point, range, or set of points determined in 514. For example, the routine may determine the amount of distance between the actuation position of 514 and the current brake actuation position. Then, in 520, if the differential in 518 is greater than a threshold, the routine continues to 522 to provide feedback to the brake pedal via a haptic interface, or otherwise signal the vehicle operator, such as via a message center or illuminator.

If the answer to 516 is no, the routine continues to 524, the routine determines whether the current brake actuation amount is greater than the dissipative point of 514, and if so also continues to 522 to provide feedback to the operator.

In this way, it is possible for a vehicle operator to have real-time feedback information as to whether dissipative and/or regenerative braking is being provided, and thus adjust vehicle braking operation accordingly, if possible, to provide improved regenerative braking and thus improved fuel economy.

Figure 6:
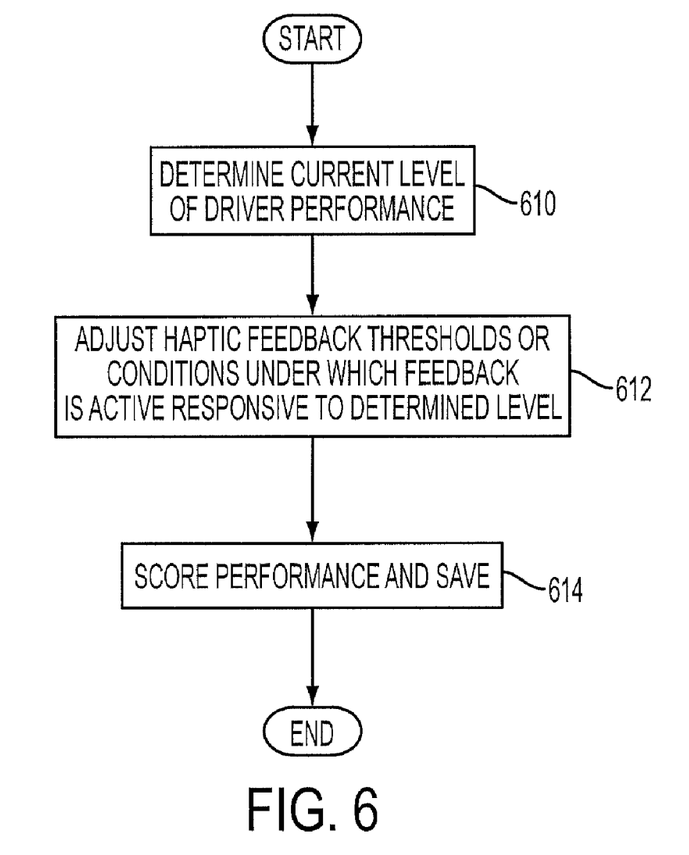

Referring now to FIG. 6, a routine is described for adjusting feedback to the vehicle operator to provide progressive training and/or feedback that accounts for an operators improved performance over time. For example, when an operator is first learning to improve vehicle operation, e.g., improve use of regenerative braking, only gross errors or grossly inefficient braking may generate driver feedback. However, over time, as the routine identifies improved operator performance, more finely tuned feedback can be provided in response to less severely inefficient braking performance. And while this example illustrates progressive feedback related to braking performance, it may also be applied, or may be more applicable, to throttle/acceleration feedback such as described in FIG. 4, for example.

In 610, the routine determines a current level of driver performance with regard to a particular attribute or set of attributes about which feedback may be provided to the operator. For example, as noted above, the routine may be providing driver feedback relating to braking performance, and in particular may be providing feedback relating to effective use of regenerative braking in a hybrid vehicle in an attempt to reduce use of dissipative brakes, when possible. The current level of performance may be an overall performance level, or various sets of performance levels across various operating conditions, for example.

Next, in 612, the routine adjusts feedback (haptic or otherwise) response thresholds or conditions under which feedback is active responsive to the level determines in 610. For example, the routine may increase acceleration and/or deceleration thresholds beyond which feedback is provided. Alternatively, the routine may vary the conditions under which feedback is provided. As another example, the routine may provide braking feedback responsive to dissipative braking less frequently, or only when a higher level of dissipative braking is performed or request. Finally, in 614, the routine scores and saves the current performance level for future use.

Note that it may be possible to account for a plurality of different vehicle operators by tracking performance and providing responsive feedback differently for different operators using key-fobs, or other identification. Further still, an initial driver performance may be determined during the first part of a vehicle drive, and then this may be used to set the driver performance level. Further still, other approaches may also be used.

Figure 7A:
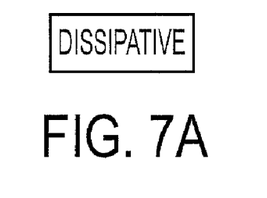
FIGS. 7A and 7B show example driver displays illustrating vehicle braking operation.

Referring now to FIG. 7A, a first example display is provided which is shown in the illuminated condition, and when not illuminated, it may be substantially hidden. In this example, the illumination indicates that dissipative braking is currently being performed, and when not illuminated, this may indicate that regenerative braking is being performed, or that no braking is being performed. As such, this is one example form of driver feedback that may be used.

Figure 7B:
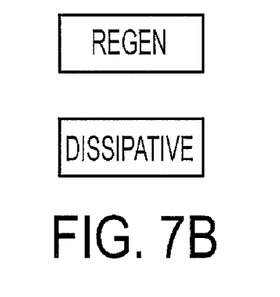

FIG. 7B shows a second example of driver feedback, in which the driver can differentiate a type of braking, and whether any braking, is being performed. Specifically, in this example, two displays that may be illuminated are shown in the illuminated state. The top indicates regenerative braking is active, and the bottom indicates dissipative braking is active.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to engines of V-6, I-4, I-6, V-12, opposed 4, and other engine or propulsion system types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling a vehicle, comprising:
   during braking actuation of a brake by an operator, providing anticipatory coaching feedback to the operator through a haptic operator interface; and
   during vehicle operation, providing coaching feedback to the operator through the haptic operator interface that as a result of operator action identifies undesirable driver behavior and lack of appropriate driver input due to a pedal tip-out.

2. The method of claim 1 wherein said braking actuation includes brake pedal actuation.

3. The method of claim 2 wherein said coaching feedback is provided by an electrical actuator.

4. The method of claim 2 wherein said coaching feedback is further responsive to ambient conditions.

5. The method of claim 4 wherein said coaching feedback further varies with a road grade.

6. The method of claim 1 wherein providing anticipatory coaching feedback to the operator through the haptic operator interface notifies the operator that dissipative braking is imminent before dissipative braking is actually performed.

7. A method of controlling a hybrid vehicle having a battery, the hybrid vehicle driven by an operator, the hybrid vehicle including a regenerative braking system coupled to the battery, a dissipative braking system coupled to the hybrid vehicle, a brake lever, an accelerator pedal, and a haptic operator interface coupled to the brake lever and the accelerator pedal, the method comprising:
   adjusting regenerative and dissipative brake actuation of the hybrid vehicle responsive to an operator braking actuation;
   during braking actuation of the brake lever by the operator, providing coaching feedback to the hybrid vehicle operator through the haptic operator interface responsive to a type of brake actuation and an operator selectable driving mode, the type including regenerative and dissipative brake operation, the coaching feedback further accounts for improved operator performance over time; and
   providing the coaching feedback to the operator through the haptic operator interface by identifying undesirable driver behavior and lack of appropriate driver input at current vehicle conditions from the accelerator pedal, where said lack of appropriate driver input is due to a pedal tip-out.

8. A method of controlling a hybrid vehicle driven by an operator having a battery, a regenerative braking system coupled to the battery, a dissipative braking system coupled to the hybrid vehicle, a brake lever, and a haptic operator interface coupled to the brake lever, comprising:
   during vehicle operation, providing coaching feedback to the operator through the haptic operator interface that as a result of operator action identifies undesirable driver behavior and lack of appropriate driver input at current vehicle conditions, said coaching feedback further responsive to an operator selectable driving mode and operating conditions including a state of charge of the battery, said coaching feedback being reduced or suppressed when the state of charge of the battery is high enough or road grade is steep enough such that additional regenerative braking is not converted to stored energy in the battery, wherein said lack of appropriate driver input is due to a pedal tip-out.

\* \* \* \* \*